United States Patent [19]

Uchida et al.

[11] Patent Number: 5,560,898
[45] Date of Patent: Oct. 1, 1996

[54] PROCESS OF ISOLATING CARBON NANOTUBES FROM A MIXTURE CONTAINING CARBON NANOTUBES AND GRAPHITE PARTICLES

[75] Inventors: Kunio Uchida; Motoo Yumura, both of Tsukuba; Satoshi Ohshima, Abiko; Yasunori Kuriki, Tsukuba; Kiyoshi Yase, Tsukuba; Fumikazu Ikazaki, Tsukuba, all of Japan

[73] Assignee: Director-General of Agency of Industrial Science and Technology, Japan

[21] Appl. No.: 283,508

[22] Filed: Aug. 1, 1994

[30] Foreign Application Priority Data

Aug. 4, 1993 [JP] Japan .................. 5-212270

[51] Int. Cl.⁶ .................. D01F 9/12; C01B 31/02
[52] U.S. Cl. .................. 423/461; 423/447.2; 423/445 B
[58] Field of Search .................. 423/445 B, DIG. 39, 423/DIG. 40, 447.2, 461

[56] References Cited

U.S. PATENT DOCUMENTS

| 4,254,823 | 3/1981 | Cederqvist | 162/55 |
| 5,346,683 | 9/1994 | Green et al. | 423/445 B |

OTHER PUBLICATIONS

Pang, L. S. K., et al. "Thermogravimetric Analysis of Carbon Nanotubes and Nanoparticles", J. Phys. Chem., vol. 97, #27, pp. 6941–6942 (08 Jul. 1993).

Seraphin, S., et al. "Effect of Processing Conditions on the Morphology and Yield of Carbon Nanotubes", Carbon, vol. 31, #5, pp. 685–689 (1993, no month).

T. Ebbesen, et al. "Purification of Nanotubes", Nature, vol. 369, p. 519 (10 Feb. 1994).

Ajayan, P. M., et al. "Opening Carbon Nanotubes with Oxygen and Implications for Filling", Nature, vol. 362, pp. 522–525 (8 Apr. 1993).

Saito, Y., et al. "Growth and Structure of Graphitic Tubules and Polyhedral Particles . . . ", Chem. Phys. Lett; vol. 204, #3,4, pp. 277–282 (19 Mar. 1993).

Ebbesen, et al "Large–Scale Synthesis of Carbon Nanotubes," Nature, vol. 358, 16 Jul. 1992, pp. 220–222.

Primary Examiner—Michael Lewis
Assistant Examiner—P. T. DiMauro
Attorney, Agent, or Firm—Lorusso & Loud

[57] ABSTRACT

Carbon nanotubes are isolated from a mixture containing the carbon nanotubes and graphite particles by a process including the steps of:

finely pulverizing the mixture;

dispersing the pulverized product in a liquid medium;

centrifuging the resulting dispersion to obtain a supernatant containing carbon nanotubes and graphite particles having a particle size of 0.3 μm or less;

separating the supernatant into a solid phase and a liquid phase; and calcining the solid phase in an oxygen-containing atmosphere at a temperature sufficient to burn the graphite particles and to leave the nanotubes.

6 Claims, No Drawings

PROCESS OF ISOLATING CARBON NANOTUBES FROM A MIXTURE CONTAINING CARBON NANOTUBES AND GRAPHITE PARTICLES

BACKGROUND OF THE INVENTION

This invention relates to a process for the isolation of carbon nanotubes from a mixture containing carbon nanotubes and graphite particles.

Carbon nanotubes are recently discovered, hollow graphite tubules having a diameter of generally several to several tens nanometers. One method for the preparation of carbon nanotubes is disclosed by Ebbesen et al (Nature, 358, 220(1992)). In this method, the carbon nanotube crude product having a nanotube content of at most 5% by weight is ground and is sonicated in ethanol to remove graphites particles. However, since part of the graphite particles are held in aggregated carbon nanotubes, it is difficult to separate pure carbon nanotubes in a high yield. The carbon nanotubes obtained by the above process still contain a significant amount of graphite particles. No effective methods have thus far been proposed for the Isolation of carbon nanotubes in a highly pure form.

SUMMARY OF THE INVENTION

The present invention provides a process for the isolation of carbon nanotubes from a mixture containing carbon nanotubes having a length of 1 μm or more and a diameter of 50 nm or less and graphite particles having a particle diameter of 0.1–5 μm. The process comprises the steps of:

pulverizing the mixture to obtain a pulverized product having an average particle diameter of 0.2–0.6 μm and containing 20–60% by weight of particles having a particle size of 0.3 μm or less;

dispersing the pulverized product in a liquid medium to obtain a dispersion;

centrifuging the dispersion to obtain a precipitate rich in graphite particles having a particle size of 0.3 μm or more and a supernatant containing fine particles having a particle size of 0.3 μm or less and including carbon nanotubes and graphite particles;

separating the supernatant into a solid phase and a liquid phase; and calcining the solid phase in an oxygen-containing atmosphere at a temperature sufficient to burn the graphite particles and to leave the nanotubes.

The term "particle size" used in the present specification is intended to refer to that measured by the sedimentation method in which the particle size is determined according to the Stokes' equation.

It is the prime object of the present invention to obtain carbon nanotubes having a purity of 90% or more, especially 99% or more.

Other objects, features and advantages of the present invention will become apparent from the detailed description of the invention to follow.

DETAILED DESCRIPTION OF THE PREFERRED EMBODIMENTS OF THE INVENTION

In the present invention, a mixture containing carbon nanotubes having a length of 1 μm or more and a diameter of 50 nm or less and graphite particles having a particle diameter of 0.1–5 μm is used as a raw material. Such a raw material mixture may be obtained by the method disclosed in the above Ebbesen et al article. The raw material mixture may contain carbon nanotubes and graphite particles having a size outside of the above ranges. Generally, the content of the carbon nanotubes in the raw material mixture is at most about 5% by weight. However, the process of the present invention is effective for a raw material mixture having a carbon nanotube content of more than, for example, 50% by weight.

The raw material mixture is first pulverized to obtain a pulverized product having an average particle diameter of 0.2–0.6 μm and containing 20–60% by weight of particles having a particle size of 0.3 μm or less. The pulverization may be performed by any suitable known dry or wet grinding method. One preferred grinding method includes pulverizing the raw material mixture in an alcohol such as ethanol, methanol or butanol by means of a media agitating mill using high toughness zirconia balls as grinding media.

The pulverized product is then dispersed in a liquid medium to obtain a dispersion. When the pulverization has been effected by a wet grinding method, the pulverized product is dried before the dispersion step. As the liquid medium, water is preferably used. In this case, it is also preferred that the aqueous medium contain a surfactant, such as sodium oleate, polyoxyethylene alkylphenyl ether or polyoxyethylenepolyol carboxylic acid ester, in an amount of 0.05–0.3% by weight. Irradiation with an ultrasonic wave is also preferably performed to accelerate the dispersion.

The resultant dispersion is then centrifuged to obtain a precipitate rich in graphite particles having a particle size of 0.3 μm or more and a supernatant containing carbon nanotubes and graphite particles having a particle size of 0.3 μm or less. The centrifugation is generally performed at a centrifugal acceleration of 8,000–12,000 G for 30–60 minutes. As a result of the centrifugation, 70–80% by weight of the graphite particles precipitate, while the remainder of the graphite particles and substantially all of the carbon nanotubes are present in the supernatant.

The supernatant is separated into a solid phase and a liquid phase by, for example, filtration with a micro-pore filter. The solid phase is dried and calcined in an oxygen-containing atmosphere at a temperature sufficient to burn the graphite particles contained therein. Since carbon nanotubes are less combustible than graphite, it is possible to selectively burn the graphite alone by suitably selecting the calcination temperature. The calcination is generally performed at 500°–800° C., preferably 700°–750° C. The calcination time is generally 1–30 minutes.

The raw material mixture to be treated according to the process of the present invention may additionally contain amorphous carbon. The amorphous carbon is easily decomposed during the calcination step and does not adversely affect the purification of carbon nanotubes.

The following examples will further illustrate the present invention.

EXAMPLE 1

Carbon nanotubes were prepared in accordance with the method disclosed in the above-mentioned Ebbesen et al article. Thus, two graphite rods were disposed in a carbon cluster producing vessel maintained at a flowing helium pressure of 500 Torr. The anode graphite rod had a diameter of 8 mm. A DC voltage of 18 V was impressed between the two rods. A crude carbon nanotube product (0.721 g) thus obtained was ground in a mortar and sonicated in ethanol for 60 minutes. The resulting dispersed solids (0.253 g) were collected. The solids (0.200 g) were charged, together with 20 ml of ethanol and 200 g of high toughness zirconia balls (diameter: 1 mm), in a high speed media agitating mill (maintained at 8° C.) and pulverized for 30 minutes at agitating speed of 3.6 m/second. The pulverized product was collected and dried. Then, the pulverized product was sonicated in 300 ml of an aqueous solution containing 0.2% by weight of sodium oleate for 60 minutes to obtain a dispersion. The dispersion was centrifuged at 12,000 G for 30 minutes to obtain a supernatant having an average particle size of 0.2 μm. The supernatant was filtered through a 0.45 μm micro filter under a pressure and the solids phase was washed with 6N nitric acid. The washed solids were calcined at 750° C. for 5 minutes in air, thereby to leave 0.018 g of a solids product. The scanning electric microphotograph reveals that the solids are carbon nanotubes containing substantially no graphite.

COMPARATIVE EXAMPLE 1

A crude carbon nanotube product was prepared in the same manner as that in Example 1. The crude carbon nanotube product was ground in a mortar and sonicated in ethanol for 60 minutes. The resulting dispersed solids were collected, dried and then calcined at 750° C. for 5 minutes. The scanning electric microphotograph revealed that a significant amount of graphite particles having a particle size of about 1 μm were present in carbon nanotubes product.

COMPARATIVE EXAMPLE 2

Comparative Example 1 was repeated in the same manner as described except that the calcination temperature was raised to 800° C. It was found that though the amount of graphite particles was decreased by calcination, the amount of carbon nanotubes was smaller than that in Comparative Example 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A process for the isolation of carbon nanotubes from a mixture containing carbon nanotubes and graphite particles, said process comprising the steps of:

pulverizing said mixture to obtain a pulverized product;

dispersing said pulverized product in a liquid medium to obtain a dispersion;

centrifuging said dispersion to obtain a precipitate of graphite particles having a particle size of 0.3 μm or more and a supernatant containing fine particles having an average particle size of 0.2 μm or less and including carbon nanotubes and graphite particles;

separating said supernatant by microfiltration into a solid phase including said fine particles and a liquid phase; and calcining said solid phase in an oxygen-containing atmosphere at a temperature sufficient to burn selectively the graphite particles and to leave the nanotubes.

2. A process as claimed in claim 1, wherein said pulverization step is performed in ethanol.

3. A process as claimed in claim 1, wherein said pulverization is by a media agitating mill.

4. A process as claimed in claim 1, wherein said liquid medium is an aqueous medium containing a surfactant.

5. A process as claimed in claim 1, wherein said calcining is at 500°–800° C.

6. A process as claimed in claim 1 wherein said calcining step produces a solid phase containing substantially no graphite particles.

* * * * *